D. Y. Smith.
Auger-Handle.
N° 72099. Patented Dec. 10, 1867.

Witnesses
Thos. H. Hutchins
Isaac T. Millspaugh

Inventor:
Daniel Y. Smith

DANIEL Y. SMITH, OF JOLIET, ILLINOIS.

Letters Patent No. 72,099, dated December 10, 1867.

IMPROVEMENT IN AUGER-HANDLES.

The Schedule referred to in these Letters Patent and making part of the same.

Be it known that I, DANIEL Y. SMITH, of the city of Joliet, in Will county, State of Illinois, have invented a new and useful Improvement on an Auger-Handle; and I do hereby declare the following to be a full, clear, and exact description of the construction and operation of the same, reference being had to the accompanying drawings, making a part of this specification, in which—

Figure 1:
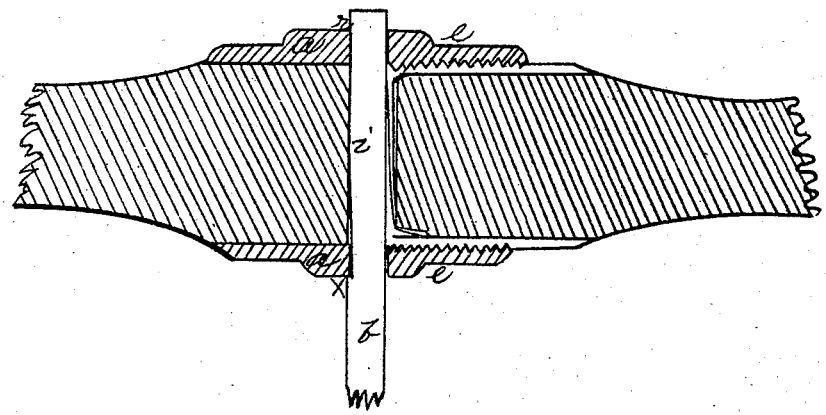

Figure 1 is a sectional view, and

Figure 2:
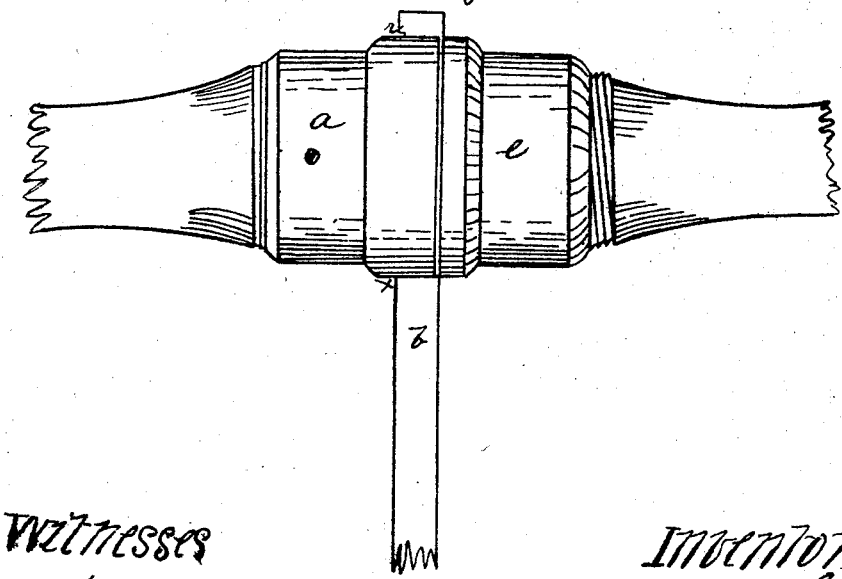

Figure 2 a perspective view.

The object of this invention is to so construct the handle of the common auger that the same handle may be used for any number of augers.

The novelty consists in the use of the metal ferrule $a$, at the middle of the handle, through which passes the shank $b$, the flat spring $c$ pressing the shank to one side of the aperture through the handle, so that the notches $r$ and $x$ engage with the outer edges of the ferrule $a$, so the auger will not drop out while in the act of changing augers or if the nut $e$ should get loose. The cam-swell at $z$ on the shank facilitates the removal or adjustment of the auger, making it easier to pull the upper notch at $r$ down through. The nut $e$ is used to screw up against the shank $b$ to hold it firm in place.

This invention is also intended to be used on the common brace for the same purpose.

Claim.

What I claim as new in my invention, and desire to secure by Letters Patent, is—

The combination of the ferrule $a$ with the annular nut $e$ and flat spring $c$, when constructed and arranged as and for the purposes set forth.

DANIEL Y. SMITH.

Witnesses:
  THOS. H. HUTCHINS,
  F. K. BAILEY.